(12) United States Patent
Geka et al.

(10) Patent No.: US 7,677,804 B2
(45) Date of Patent: Mar. 16, 2010

(54) LINEAR MOTION GUIDE UNIT

(75) Inventors: Toshiaki Geka, Kamakura (JP); Hideaki Ogura, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 993 days.

(21) Appl. No.: 11/086,910

(22) Filed: Mar. 23, 2005

(65) Prior Publication Data

US 2005/0213856 A1 Sep. 29, 2005

(30) Foreign Application Priority Data

Mar. 24, 2004 (JP) ............................. 2004-087471

(51) Int. Cl.
*F16C 29/06* (2006.01)

(52) U.S. Cl. .......................................... 384/45; 384/43

(58) Field of Classification Search .................. 384/43, 384/45
See application file for complete search history.

(56) References Cited

U.S. PATENT DOCUMENTS

| | | | | |
|---|---|---|---|---|
| 4,441,765 A | * | 4/1984 | Kasai et al. | 384/45 |
| 4,505,522 A | * | 3/1985 | Tanaka | 384/45 |
| 4,557,532 A | * | 12/1985 | Teramachi | 384/45 |
| 4,634,295 A | * | 1/1987 | Agari | 384/44 |
| 5,649,770 A | * | 7/1997 | Kuo | 384/45 |
| 5,909,965 A | * | 6/1999 | Szu et al. | 384/43 |
| 6,390,679 B1 | * | 5/2002 | Kashiwagi | 384/45 |
| 6,742,931 B2 | * | 6/2004 | Chou et al. | 384/45 |
| 6,807,746 B2 | * | 10/2004 | Matsumoto | 33/706 |
| 6,890,103 B2 | * | 5/2005 | Kasuga et al. | 384/45 |
| 2001/0008568 A1 | * | 7/2001 | Kasuga et al. | 384/45 |
| 2007/0211969 A1 | * | 9/2007 | Shimizu | 384/45 |

FOREIGN PATENT DOCUMENTS

| | | | |
|---|---|---|---|
| JP | 2001-173718 A | | 6/2001 |
| JP | 2001173718 | * | 6/2001 |
| JP | 2002-155936 A | | 5/2002 |
| JP | 2002-155936 A | | 5/2002 |
| JP | 2003-35314 A | | 2/2003 |
| JP | 2003-035314 A | | 2/2003 |
| JP | 2003-322150 A | | 11/2003 |
| WO | WO2005019668 | * | 3/2005 |

OTHER PUBLICATIONS

Shimizu, Shigeo,. Dynamic Capacity of Linear Motion Rolling Guide Elements, pp. 25-26, 1999.*
European Search Report dated Oct. 16, 2007.

* cited by examiner

*Primary Examiner*—Thomas R Hannon
*Assistant Examiner*—Justin Krause
(74) *Attorney, Agent, or Firm*—Browdy and Neimark, PLLC

(57) ABSTRACT

A linear motion guide unit is provided in which a crowning portion available extensively for standard specification is made easily. The crowning portion is comparatively small in depth, and rich in high accuracy and high durability. A raceway groove for a load race in a carriage is made at an ingress/egress area thereof with the crowning portion of a curved profile that varies gently to allow the rolling element to move in and out of the load race with smoothness. The carriage is provided at the forward and aft ends of the raceway groove with rounded bevels, which are made in a curved contour merging into the associated crowning portion without causing any discontinuity at a junction of the rounded bevel with the crowning portion.

4 Claims, 8 Drawing Sheets

LINEAR MOTION GUIDE UNIT

FIELD OF THE INVENTION

The present invention relates to a linear motion guide unit comprised of a guide rail with raceway grooves, and a slider allowed to move on the guide rail by virtue of more than one rolling element.

BACKGROUND OF THE INVENTION

Conventionally, there have been well known linear motion guide units of the sort that more than one rolling element is allowed to roll through a recirculation circuit made in a slider. In the prior linear motion guide units of the type constructed as stated earlier, as shown in FIG. 14, a carriage 3 of the slider is generally made thereon with a raceway groove 7 including a raceway surface for the provision of a load race 13. The raceway groove 7 is moreover is made in a crowning profile 43 extending across an ingress area 39, which slopes gently towards any one of forward and aft ends of the carriage 3 so as to allow the rolling elements rolling through with smoothness in and out of the load race 13. With the linear motion guide unit constructed as stated just above, the load race 13 coming into rolling-contact with the rolling element, when viewed in lengthwise transverse section, composed of forward and aft ingress areas 39 and a major load area 38 continuing the ingress areas 39 to carry substantially the bearing load thereon. The slider is comprised of the carriage 3 having thereon the raceway groove 7 to provide the load race 13, and forward and aft end caps 4 installed on the lengthwise ends of the carriage 3, one to each end, which are made therein with turnarounds 12. The crowning profile 43 is made in a gently linear slope towards any associated end of the carriage 3. At a junction of the carriage 3 with the end caps 4 where any one of the load race 13 and the turnarounds 12 transfers to the other, moreover, the carriage 3 is cut away slantwise at forward and aft ends 8 to make beveled edges or chamfered edges 44, which extend straight from the crowning profile 43 towards their associated inside curved surfaces 27 of the end caps 4. In other words, the crowning profile 43 is cut away at the forward and aft ends thereof to provide the chamfered edges 44.

Another linear motion guide unit is disclosed in, for example, Japanese Patent Laid-Open No. 2003-322150, in which the slider is made with linear crowning profiles to get reducing variations in rolling-contact load component in traveling direction of the slider, which might occur depending on traveling of the rolling elements, thereby rendering deviations in sliding resistance less. With the prior linear motion guide unit recited above, linear crowning profiles are provided at axially opposite end areas of the slider in a way that the maximum total load exerted by the rolling elements in linear traveling direction is made less than the peak of load exerted by just one rolling element in linear traveling direction to any one linear crowning profile of the slider. Moreover, a prestressed pressure ($\delta$) in the prior linear motion guide unit is generally determined at $\delta \geq 0.002Da$. The prior linear motion guide unit as stated earlier, further, is shown as being made at the forward and aft ends thereof with arced crowning profiles identical with one another in radius (R).

The design considerations to form the crowning profile in the rolling linear motion guide unit are disclosed in, for example Japanese Patent Laid-Open No. 2003-35314. On prior designing recited here, the crowning profile is made to keep the stiffness substantially constant in at least any one of vertical, horizontal and rolling directions of the slider, even though the rolling elements travel in their axial direction between the confronting raceway grooves. The slider is also designed to keep the stiffness substantially contact in any one or both of pitching and yawing directions. The prior design consideration is envisaged making the crowning profile most suitable for reducing vibration that might occur due to travel of the rolling element, thereby improving the accuracy in sliding motion. With the prior design considerations for the provision of the rolling motion guide unit that is kept constant in stiffness, there is proposed the ideal crowning profile that is designed according to any of curves given by power-series function, composite curves, curves given by method of least squares, and so on.

A further another prior guide unit is disclosed in, for example Japanese Patent Laid-Open No. 2002-155936, in which the non-loaded area is connected with the associated load area in a way any inside edge of the turnaround passage doesn't get prominent into the raceway, which might otherwise cause any obstacle against the rolling elements during their transfer from the non-loaded area to the load area. This prior guide unit is envisaged making it possible to render the sliding resistance and noise less even when the slider travels with high velocity relatively to the guide rail, thereby achieving high-speed traveling of the slider. With the prior guide unit recited jut above, the load raceway groove extending over the load area is worked with crowning operation at the lengthwise end zones thereof to have the crowning profile that is made in a way the load raceway groove recedes gradually away from the non-loaded raceway groove as nearing the associated turnaround passage. Thus, the load raceway surface is set back at the lengthwise end thereof below the inside edge of the turnaround passage. This crowning profile would make it possible to keep certainly the load raceway groove against prominent above the inside edge of the turnaround passage towards the guide rail, regardless of whether there are any molding error in the turnaround passage and any machining error in the load raceway groove. The setback is selected to be a matter of 5% relatively to the diametral dimension of the rolling element.

Meanwhile, with the prior linear motion guide units constructed as stated earlier, the crowning profile 43 and the beveled edge 44 made on the carriage 3 have to be performed using additional operation including material removing operation and so on, apart from the working operation to make the raceway groove 7 for the provision of the load race. This means that the crowning profile 43 made on the carriage 3 can vary widely in length (LA) as well as in depth (HA) from product to product. Moreover, a boundary between the crowning profile 43 and the beveled edge 44 gets to be a sharp corner 46. This means that both the crowning profile 43 and the beveled edge 44 must undergo any fine-tuning to ensure high-speed traveling accuracy of the rolling elements. With the production of the prior linear motion guide units constructed as stated earlier, moreover, the repeatedly simulated experimental results must be conducted as often as needed to determine the crowning profile in length (LA) and in depth (HA).

In the prior linear motion guide units constructed as stated earlier, the crowning length (LA) and crowning depth (HA) can't be disclosed as any preselected length and/or depth, instead found relying on design restrictions. In addition, the raceway groove is cut to have a modified semi-circular arc in transverse section, which will come into rolling contact with the rolling element at only two points of the rolling element.

For producing the linear motion guide units needing the design considerations as stated earlier, the crowning profile would be worked with recently advanced machining technology including computer numerical control (NC) machines. The crowning profile is however sophisticated in construction, involving complex computer modeling recipes and highly refined skill for machining operation. Moreover, the rolling linear motion guide unit constructed as stated earlier has the raceway groove that is made to have a modified semi-circular arc in transverse section, which will come into rolling contact with the rolling element at only two points of the rolling element.

With the prior guide unit constructed as recited above, the crowning profile is made in a straight slope surface ending in a depth to provide a setback below the associated lengthwise edge of the carriage. Thus, the crowning profile is formed slantwise with a considerably large sloping angle, resulting in making a stepwise discontinuity between the carriage and the inside edge of the turnaround passage. After attempts to work out the crowning depth at the lengthwise end of the carriage with the premise that the inside curved surface of the turnaround passage is usually set within the tolerance of ±0.05 mm in accurate position alignment with the load raceway groove, it has been found that the dimension given by subtracting the entire distance of the load raceway groove and the non-loaded raceway groove from the overall length of the inside curved surface of the turnaround passage and the raceway groove on the guide rail would result in a matter of 0.1 mm. If the rolling element were, for example 4.7625 mm in diameter, the stepwise difference at the end of the carriage would reach 0.338 mm because of the addition of 0.238 mm that corresponds to 5% of the diameter of rolling element. This means that the crowning profile is too steep to deal with highly accurate requirements.

Thus, it is now needed to overcome the disadvantages as stated earlier in the linear motion guide unit of standard design specifications rather than the linear motion guide unit customized to suite special design specifications. Moreover, it is desired to develop the linear motion guide unit that is compliant to the high accuracy at recent high-speed traveling operation, and better long-lasting durability even under conditions of usage in high-speed, high-acceleration/high-deceleration operation. That is to say, the linear motion guide unit is recently expected to well cope with the high precision and high durability with respect to the race, and especially serve the high durability with keeping high accuracy even under high-speed, high-acceleration/high-deceleration operational environment.

SUMMARY OF THE INVENTION

The present invention, therefore, has as its primary object to overcome the problem as described just above and to provide an improved linear motion guide unit of standard design specification available widely in common use, in which a crowning profile is easily made on a raceway groove inclusive of a raceway surface cut on a carriage of a slider that fits over a guide rail inclusive of a guide shaft for relative movement each other. More particular, the present invention provides a linear motion guide unit improved in high accuracy and long-lasting service life and in which a crowning profile is not more than one tenth in depth compared with the conventional.

The present invention is concerned with a linear motion guide unit; comprising a guide rail having a raceway groove extending lengthwise thereof, a slider having a raceway groove in opposition to the raceway groove of the guide rail, the slider being movable relatively to the guide rail by virtue of more than one rolling element, a load race defined between the raceway groove in the guide rail and the mating raceway groove in the slider to carry a load with conjoining with the rolling element, and a non-loaded area in the slider made up of a turnaround passage and a return passage, the non-loaded area being communicated with the load race to allow the rolling element to run through there in a recirculation way; wherein the raceway groove in the slider is made at an ingress/egress area of the load race with a crowning portion of a curved profile that varies gently towards the turnaround passage to allow the rolling element to move in and out of the load race with smoothness; wherein the slider is comprised of a carriage made with the raceway groove and the return passage, and end caps attached to forward and aft ends of the carriage, one to each end, the end caps being each made with the turnaround passage communicating with the raceway groove and the return passage; and wherein the carriage is provided at the forward and aft ends of the raceway groove with rounded bevels, one to each end, each of which is made in a curved contour merging into the associated crowning portion without causing any discontinuity at a junction of the rounded bevel with the crowning portion.

In one aspect of the present invention, a linear motion guide unit is provided in which the crowning portion is made over a length spanning from the end of the carriage to a location on the raceway groove where the crowning portion starts from there, the length of the crowning portion being determined to a dimension equivalent to two pieces of the rolling elements, while the crowning portion is made to have a depth of a geometric dimension reaching a point of intersection of a straight line lying on the end of the carriage with a straight line starting from a point where the crowning portion occurs from there and extending forwards along the crowning portion, the depth of the crowning portion being set to a equivalent of an amount of elastic deformation that might occur in the raceway groove because of the rolling element when the load race undergoes the load reaching a half of a basic static load rating.

In another aspect of the present invention, linear motion guide unit is provided in which the crowning portion is worked out simultaneously with the raceway on the carriage, so that the crowning portion is made to merge evenly into the raceway to provide a curved profile where a radius of curvature is constant.

In another aspect of the present invention a linear motion guide unit is provided in which the rounded bevels at the ends of the raceway groove are each finished with fine lapping operation into a curved contour of mirror surface that is more comparable quality in surface roughness than the raceway groove.

In a further another aspect of the present invention, a linear motion guide unit is provided in which the rounded bevels at the ends of the raceway groove are each made to have the curved contour having the radius of curvature at least not less than 0.1 mm when viewed in a transverse section.

In another aspect of the present invention a linear motion guide unit is provided in which the crowning portion 9 on the carriage is made across 20%-40% of overall length of the carriage.

In another aspect of the present invention, a linear motion guide unit is provided in which a curved surface of the crowning portion is worked to have a profile that has a single radius of curvature when viewed in a transverse section taken on a plane of a point-contact angle of the curved surface with the rolling element.

In another aspect of the present invention, a linear motion guide unit in which the raceway groove in the slider is made in the form of a gothic arched groove that comes into four point contacts with the rolling element, working together with the mating raceway groove on the guide rail.

In another aspect of the present invention, a linear motion guide unit is provided in which the end cap includes therein a major cap body having an outside curved half for the turnaround passage, and a spacer unit having a spacer piece that is incorporated in the major cap body to form an inside curved half for the turnaround passage, while the crowning portion is made on the raceway groove in the carriage in opposition to the spacer pieces.

The constructional features recited earlier are preferably suited to the linear lotion guide unit that is comprised of the guide rail including the guide shaft, and the slider movable relatively to the guide rail by virtue of the rolling elements of ball or roller, which run through the recirculation circuit in the slider. The constructional features are also effective in complying with the needs of high accuracy as well as high durability. The constructional features defined earlier are further beneficial to rendering the working of the crowning portion more easier, making the sliding performance of the slider higher, and raising the traveling accuracy and durability in the linear motion guide unit, despite of the improvement done at very tiny parts in the ingress/egress areas of the load race at the forward and aft ends of the carriage.

In the linear motion guide unit of the present invention, the carriage is made therein with a lengthwise bore into which a lubricant impregnated sleeve of C-shape in cross section fits to provide a return passage that helps improve the rolling performance of the rolling elements.

DETAILED DESCRIPTION OF THE PREFERRED EMBODIMENTS

Figure 1:
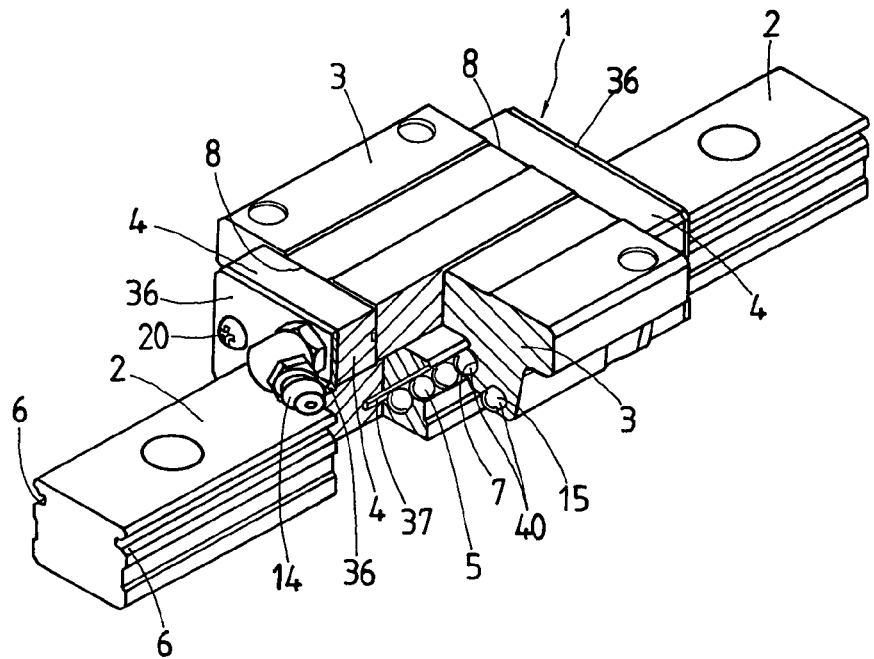
FIG. 1 is a perspective view, partially broken away, showing a preferred embodiment of a linear motion guide unit in accordance with the present invention.

The linear motion guide unit according to the present invention discussed later is adapted for extensive use in a relative sliding system of a variety of machinery including machine tools, semiconductor fabricating machines, precise instruments, and so on, which looks increasingly for high traveling accuracy as well as high durability even under high-speed, high-acceleration/high-deceleration operational environment.

A preferred embodiment of the linear motion guide unit according to the present invention will be hereinafter described with reference to the accompanying drawings. Here is shown a linear motion guide unit of the most common type in which there is provided a recirculation circuit 40 allowing more than one rolling element 5 of ball to run through there in a circulating manner while a slider 1 fits over a guide rail 2 for sliding movement relative to each other. Nevertheless, it will be appreciated that the linear motion guide unit is not limited to the fashion explained later, but may be applied alike to the type in which the rolling elements are rollers or other type in which guide rail is constituted with a guide shaft. Moreover, it is to be understood that a crowning area 9 and a rounded chamferred face or bevel 10 formed at an ingress/egress end 39 of a load race 13 in the slider 1, because of very tiny in fact to be invisible to the naked eye, are shown as being exaggerated in the drawings for easy explanation.

Figure 2:
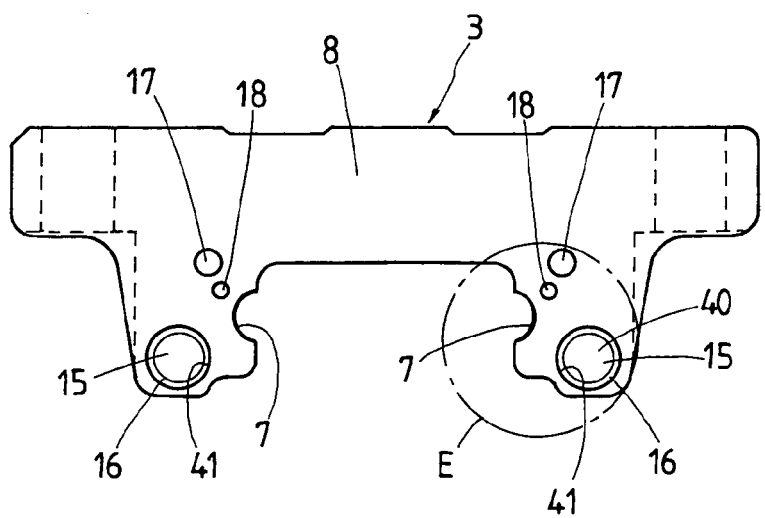
FIG. 2 is a front elevation of a carriage to be incorporated in the linear motion guide unit of FIG. 1.
Figure 3:
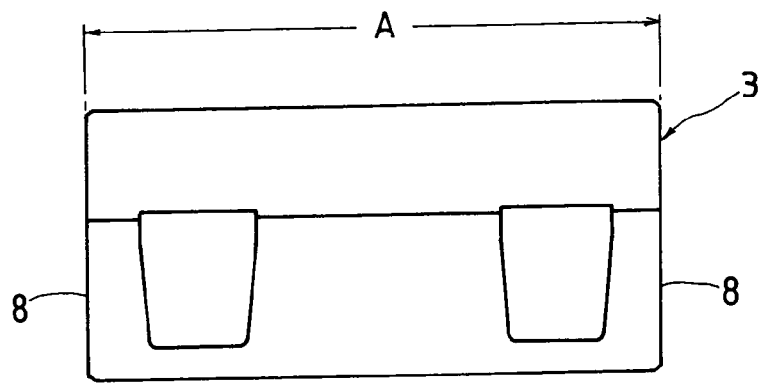
FIG. 3 is a view in side elevation of the carriage of FIG. 2.
Figure 4:
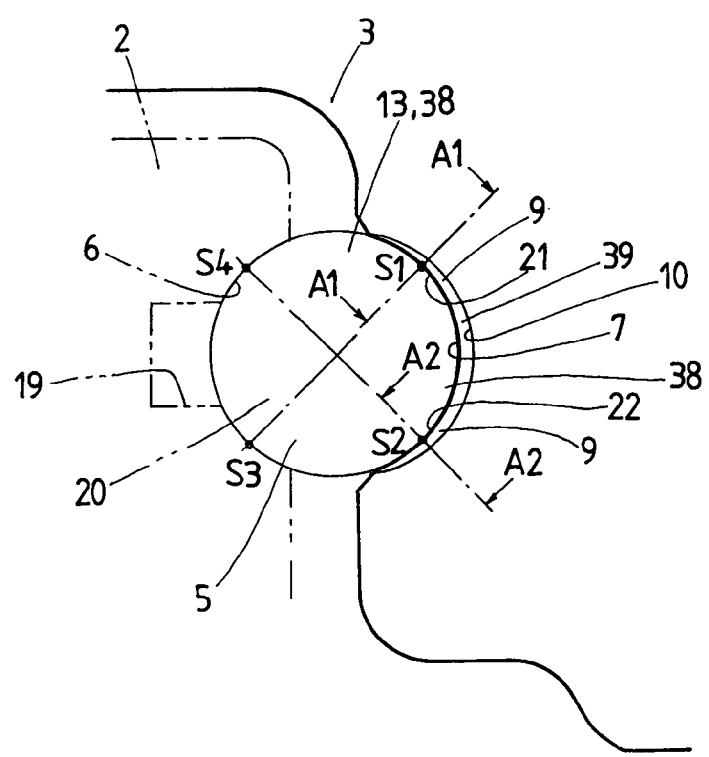
FIG. 4 is an enlarged fragmentary view in elevation of an area surrounded with a circle E in FIG. 2 to explain in detail a geometric design of a raceway.
Figure 5:
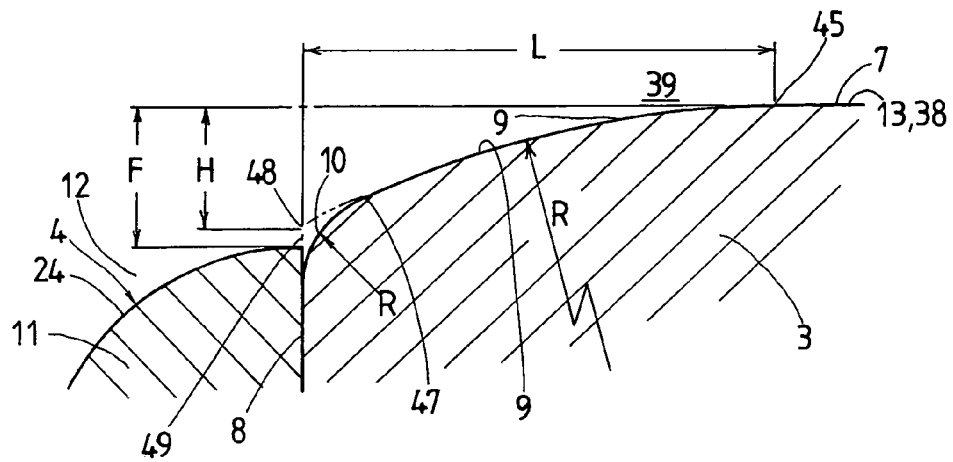
FIG. 5 is a fragmentary view in section taken on the plane of either the line A1-A1 or the line A2-A2 of FIG. 4, where a raceway surface comes into point contact with a rolling element, to illustrate a lengthwise end of the carriage together with an inside curved surface of a turnaround passage.
Figure 6:
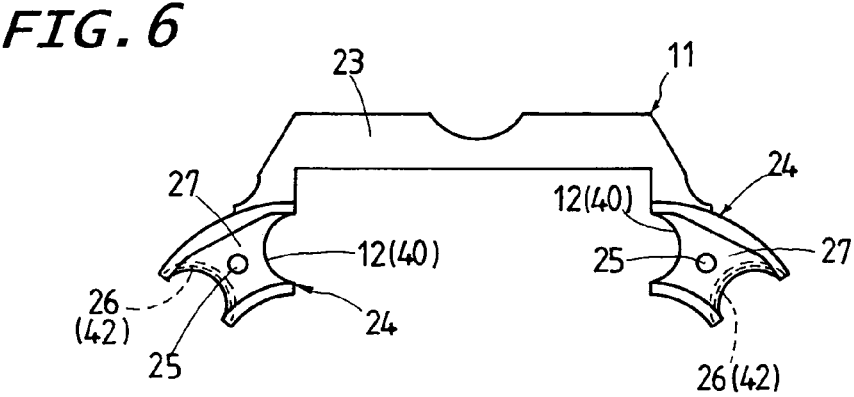
FIG. 6 is a front elevation of a spacer unit built in an end cap of the linear motion guide unit of FIG. 1 to provide the inside curved surface of the turnaround passage.
Figure 7:
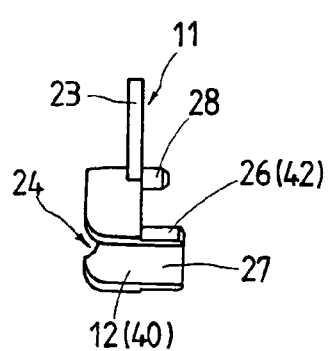
FIG. 7 is a view in side elevation showing the spacer unit of FIG. 6.

The linear motion guide unit, in particular, features the crowning portion 9 and the rounded bevel 10 made in a raceway groove 7 at forward and aft ends of a carriage 3, which correspond in position to the ingress/egress end 39 of the load race 13 in a recirculation circuit 40. Referring to FIGS. 2 and 3, there is shown the carriage 3 for the slider 1, where the crowning portion 9 is formed thereon. In FIG. 4, there is shown the raceway groove or the load race 13 constituted with the carriage 3 that fits over the guide rail 2. The lengthwise end of the carriage 3 is shown enlarged to illustrate in detail the crowning portion 9 and the rounded bevel 10. The carriage 3 as shown in FIG. 2 is moreover made therein with a lengthwise bore 41 into which a lubricant sleeve 16 fits to provide a return passage 15. Referring further to FIG. 5 that is a view in section taken in the direction of contact angle connecting between a point contact position S1 or S2 of the rolling element of ball 5 with the raceway groove 7 on the carriage 3 and another point contact position S3 or S4 of the rolling element of ball 5 with the raceway groove 6 on the guide rail 2, that is, taken on the plane of either the line A1-A1 or the line A2-A2 of FIG. 4, there is shown fragmentarily the end of the carriage 3 and a mating spacer unit 11 incorporated in an end cap 4.

The linear motion guide unit of the present invention is in general comprised of the guide rail 2 inclusive of a guide shaft having the lengthwise raceway groove 6 inclusive of a raceway surface, and the slider 1 that fits over the guide rail 2 for sliding movement relatively to the guide rail 2 by virtue of more than one rolling element of a ball 5. The slider 1, more particular, includes the carriage 3 made therein with the raceway groove 7 and the return passage 15, the end caps 4 mounted to the forward and aft ends of the carriage 3, one to each end, and made therein the turnaround passages 12 to communicate the raceway groove 7 to the return passage 15, end seals 36 attached on outside faces of the end caps 4, one to each cap, and a retainer band 37 to keep the rolling elements 5 against falling away from the slider 1. A grease nipple 14 is attached to any one of the end seals 36.

The carriage 3 is made on widthwise opposite sides thereof with the raceway grooves 7 in opposition to their associated raceway grooves 6 lying on the guide rail 2 to provide the load race 13 where the load can be carried with the rolling elements 5. The carriage 3 also has the return passages 15 of the non-loaded area. The end caps 4 each include the turnaround passage 12 of the non-loaded area, which continues to the associated load race 13 to complete the recirculation circuit 40 where the rolling elements 5 are allowed to run through there in a circulating manner. The recirculation circuit 40 is made up of the load race 38 defined with the raceway groove 7 cut in the carriage 3, the turnaround passages 12 made in the end caps 4, and the return passage 15 made in the carriage 3. The carriage 3 is provided at the forward and aft ends 8 thereof with a positioning hole 18 that are used to set the end caps 4 in place on the forward and aft ends 8, and a threaded hole 17 into which a screw is driven to fasten the end cap 4 on the carriage 3.

A constructional feature of the linear motion guide unit is that the crowning portion 9 is made along the raceway groove 7 of the slider 1 at the ingress/egress 39 of the load race 13, the crowning portion 9 being in particular worked to have a curved surface varying gently in profile towards the associated turnaround passage 12 to make certain that the rolling elements 5 are allowed to move smoothly in and out of the raceway 38 of the load race 13. Another constructional feature according to the present invention is that the rounded bevels 10 of curved contour having the radius of curvature (R) are made at the forward and aft ends of the raceway groove 7 on the slider 1, one to each end, the beveled edges 10 being each made to merge into the crowning portion 9 with continuity through a boundary 47 between the crowning portion 9 and the associated bevel 10, which is rounded with no sharp edge. Moreover, the crowning portion 9 is made over a length (L) extending from the end 8 of the carriage 3 to the raceway 38 of the raceway groove 7, or a length spanning from the end 8 of the carriage 3 to a location on the raceway groove 7 where the crowning portion 9 starts from there. The length (L) of the crowning portion 9 is set to a dimensional equivalent to two pieces of the rolling elements 5. Moreover, a depth (H) of the crowning portion 9 refers to a geometric dimension reaching a point 48 of intersection of a straight line lying on the end 8 of the carriage 3 with a straight line starting from a point 45 where the crowning portion 9 occurs from there and extending forwards along the crowning portion 9. The depth (H) of the crowning portion 9 is set to the equivalent of an amount of elastic deformation that might occur in the raceway groove 7 because of the rolling elements when the load race undergoes the load reaching a half of the basic static load rating.

In machining operation of the raceway groove 7, the crowning portion 9 is worked out simultaneously with the raceway 38, so that the crowning portion 9 can be made to merge evenly into the raceway 38 in a way not causing any discontinuity at the starting point 45 of the crowning portion 9. The curved surface of the crowning portion 9 is worked to have a curved profile where the radius of curvature is constant when viewed in a transverse section taken on the plane of the point-contact angle of the curved surface with the rolling element 5. The crowning portion 9 is preferably made across 20%-40% in lengthwise direction of the carriage 3. The rounded bevel 10 at the end of the raceway groove 7 is finished with the fine lapping operation into a curved contour of mirror surface that is more comparable quality in surface roughness than the raceway groove 7. The rounded bevel 10 at the end of the raceway groove 7 is made to have the curved contour having the radius of curvature (R) at least not less than 0.1 mm when viewed in a transverse section. The raceway groove 7 in the carriage 3 is made in the form of gothic arched groove that comes into four point-contacts (S1, S2, S3 and S4) with the rolling element 5, working together with the mating raceway groove 6 on the guide rail 2.

Referring to FIGS. 6 to 9, there are shown end caps 4, which are each made therein with the turnaround passages 12 for the recirculation circuit 40 and installed on the forward and aft ends 8 of the carriage 3, one to each end, as shown in FIG. 1. The end cap 4 includes therein a spacer unit 11 shown in FIGS. 6 and 7 and a major cap body 30 shown in FIGS. 8 and 9. That is, the end cap 4 is comprised of the major cap body 30 and the spacer unit 11 incorporated in the major cap body 30. The spacer unit 11 has a connector 23 and spacer pieces 24. The connector 23 fits into a socket 32 formed in the major cap body 30 while the spacer pieces 24 fit into mating recesses 33 in the major cap body 30 whereby the spacer unit 11 is held in place to the major cap body 30. The turnaround passage 12 in the end cap 4 is defined between an inside curved half 27 on the spacer unit 11 and an outside curved half 31 on the major cap body 30. The spacer unit 11 is composed of a pair of the spacer pieces 24 on which there are made the inside curved halves 27 for the turnaround passages 12, and the connector 23 to join together the spacer pieces 24 with one another. The connector 23 can serve for making it easier to fit very tiny spacer pieces 24 into the major cap body 30 at one time. Moreover, the spacer pieces 24 are each made with a positioning pin 28 and an oil hole 25. The end cap 4 is attached in place to the carriage 3 after the positioning pin 28 has fit into a mating hole 18 in the carriage 3. The major cap body 30 is further provided therein with a threaded opening 34 that is used to fasten the grease nipple 14 thereto, and an oil passage 50 communicated to the threaded opening 34. The oil path 50 is opened to an oil groove 51, so that lubricant applied through the grease nipple 14 can reach the rolling elements 5 through the oil path 50, oil groove 51 and the oil hole 25.

Figure 8:
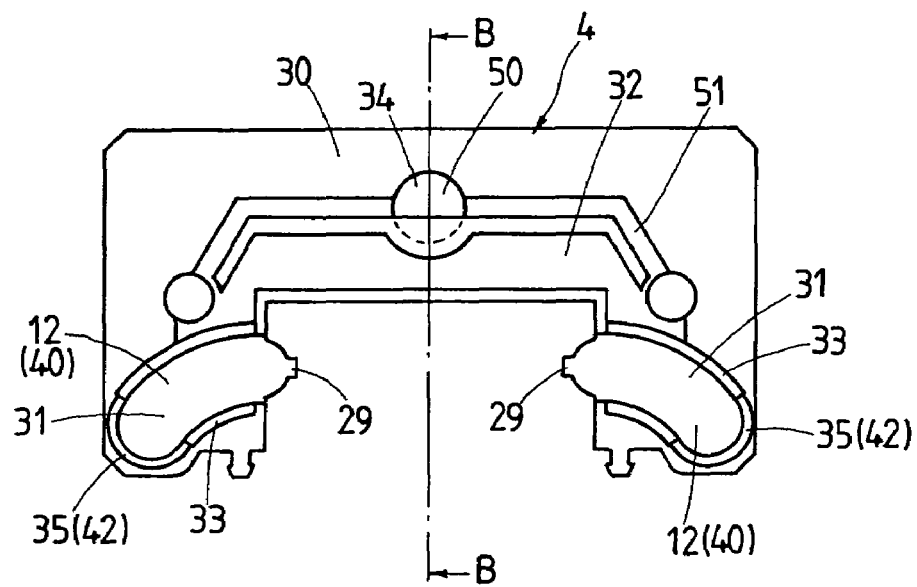
FIG. 8 is a view in rear elevation of the end cap of the linear motion guide unit of FIG. 1 to show an outside curved surface of the turnaround passage.
Figure 9:
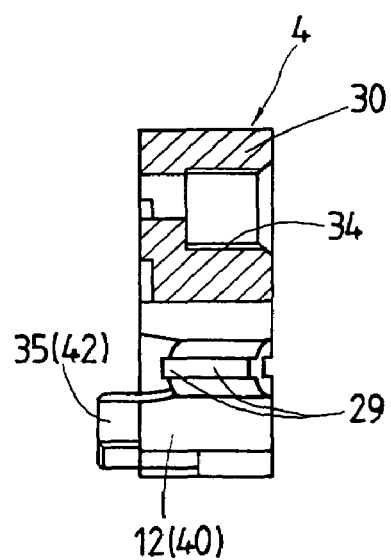
FIG. 9 is a sectional view of the end cap, taken on the plane of the line B-B of FIG. 8.

The spacer piece 24 in the spacer unit 11 is further made with a connecting insert 26 of semicircular contour in cross section in opposition to the return passage 15. The connecting insert 26 will fit into a receptacle 41 made at the associated end of the return passage 15 in the carriage 3, making sure of smooth recirculation of the rolling elements 5. The major cap body 30, as shown in FIGS. 8 and 9, is provided therein with the recesses 33 to accommodate therein the associated spacer pieces 24 of the spacer unit 11, thereby combining the spacer pieces 24 with the major cap body 30 into a unitary end cap 4 to join the inside and outside curved halves 27 and 31 together with one another to complete the turnaround passages 12. The outside curved half 31 for the turnaround passage 12 is made with a connecting insert 35 of semicircular contour in cross section in opposition to the return passage 15. The connecting insert 35 will fit into a receptacle 41 made at the associated end of the return passage 15 in the carriage 3, making sure of smooth recirculation of the rolling elements 5. The outside curved half 31 for the turnaround passage 12 is further made with a claw 29 in opposition to the raceway 38 or the load race 13 to scoop the rolling elements 5 running through either from the load race 13 into the turnaround passage 12 or from the turnaround passage 12 into the load race 13, thereby making certain of smooth recirculation of the rolling elements 5. The scooping claw 29 fits into the associated raceway groove 6 on the guide rail 2 in a way the tip thereof enters a slot 19 into which the retainer band 37 fits.

The construction feature in the linear motion guide unit constructed as stated earlier is that the crowning portions 9 are made at the forward and aft end of the load race 13 in the slider 2, that is, at the ingress/egress ends 39 of the carriage 3, and also the crowning portions 9 are cut away slantwise at their ends to make the beveled edges 10 of round contour. The crowning portion 9, as seen in FIG. 4, is worked into the gently curved profile that is curved over roughly semicircular range of the ingress/egress ends 39 of the raceway groove 7. The crowning portion 9, as shown in FIG. 5, is made to have the length (L) of a dimension equivalent to two pieces of the rolling elements 5. Moreover, the depth (H) of the crowning portion 9 is set to the equivalent of an amount of elastic deformation that might occur in the raceway groove 7 because of the rolling elements when the load race undergoes the load reaching a half of the basic static load rating. Here, the basic static load rating refers to the load capacity that can carry the maximum allowable static load predetermined from the linear motion guide unit without incurring any obstacle for operation. With the linear motion guide unit using the rolling element 5 of 4.7625 mm in diameter, the crowning length (L) results in 9.53 mm while the crowning depth (H) is 0.025 mm. The crowning portion 9 accounts for only a tiny part of the raceway groove 7 in the carriage 3, though, the crowning portion 9 in FIG. 5 is shown as being exaggerated to get discerned more easily.

The crowning depth (H) is very small compared to the carriage 3 itself and, therefore, an abutment level (F) where the inside curved half 27 of the spacer piece 24 in the end cap 4 comes into contact with the mating end of the carriage 3 is determined within the tolerance of a matter of ±0.05 mm acceptable with respect to the location of the spacer piece 24. Thus, the abutment level (F) is deep below the crowning depth (H) (F>H), resulting in causing a step 49 there.

Figure 10:
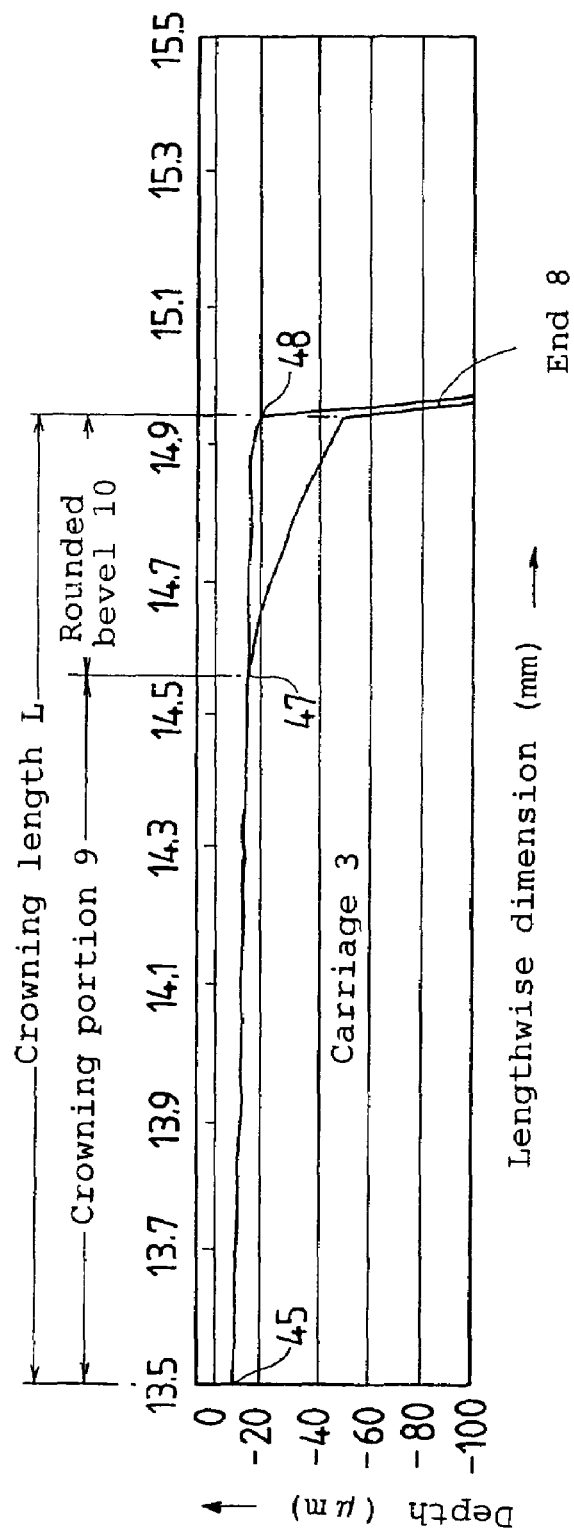
FIG. 10 is a graphic display of data given by actual measurements of the crowning profile and the rounded bevel made on the carriage of FIG. 5.
Figure 14:
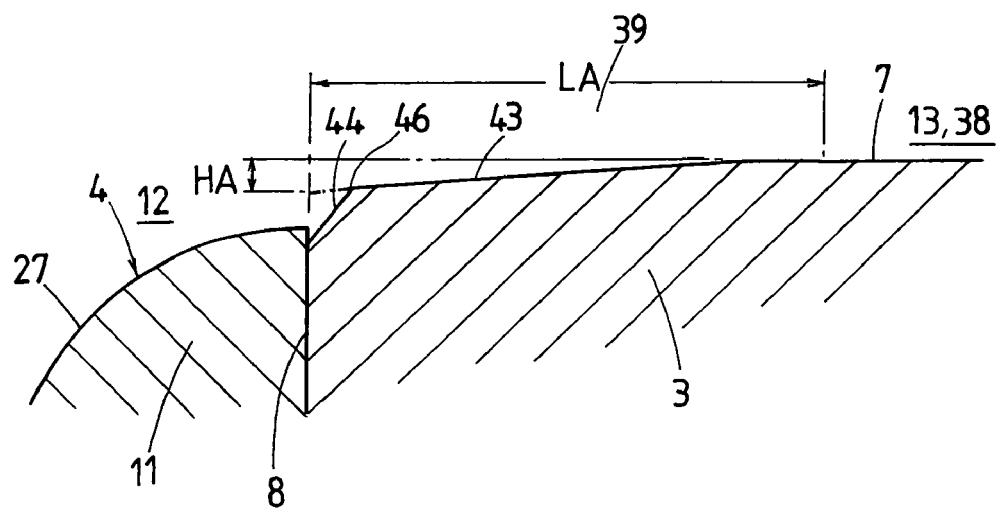
FIG. 14 is a view similar to FIG. 5 to explain the prior construction.

With the prior linear motion guide unit as shown in FIG. 14, to cope with the step 49, the beveled or chamfered edge 44 is made at the junction of the load race 13 with the turnaround passage 12. With the linear motion guide unit of the present invention, in contrast, the beveled edge 10 is made in the curved contour having the radius of curvature (R), which is rounded with no sharp edge from the end of the load race 13, or the end 8 of the carriage 3, towards the crowning portion 9. In the linear motion guide unit constructed as stated earlier, the beveled edge 10 of rounded contour is finished with the dedicated fine-lapping machine using five-graded emery tape into a curved contour of mirror surface that is more comparable quality in surface roughness than the raceway groove 7. The rounded bevel 10, as with the crowning portion 9, accounts for only a tiny part, though, the rounded bevel 10 is made to have the curved contour having the radius of curvature (R) at least not less than 0.1 mm when viewed in a transverse section. The crowning portion 9 and the rounded bevel 10 are made to have numerical values indicated in FIG. 10 where the abscissa refers to the crowning length (L) while the ordinate refers to the crowning depth (H).

The crowning portion 9 is worked to have a curved profile that merges evenly into the raceway groove 7 in a way not causing any discontinuity even at the starting point 45 or the boundary between the crowning portion 9 and the raceway groove 7, which is the race area 38 to carry substantial load thereon. The constructional feature can be accomplished by the creep-feed machining operation in which the overall raceway groove 7 inclusive of the crowning portion 9 is machined simultaneously at one time. With the machining operation as stated just above, the curved surface of the crowning portion 9 is worked to have a profile that has the same radius of curvature as the curved surface of the raceway 38 at the boundary between the crowning portion 9 and the raceway 38. Specifically, both the crowning portion 9 and the raceway 38 are finished into a united curvature. Moreover, the profile of the crowning portion 9 when viewed in transverse section thereof is made in curved surface where the radius of curvature is constant, or a curved profile having just one radius of curvature, that can be easily worked simultaneously with raceway groove 7 by using the creep-feed machining operation. Of the rolling elements 5 running through the recirculation circuit 40, the rolling elements 5 weighing on the raceway 38 will vary in number with every time when moving in and out of the raceway 38 of the load race 13. This variation in number of the rolling elements 5 weighing on the raceway 38 will causes complex posture variations in the slider 1 of pitching, yawing and rolling. The crowning portion 9 constructed as stated earlier plays an important role in keeping the posture variations in the slider 1 less, improving the traveling accuracy of the slider 1. To this end, the crowning portion 9 in the linear motion guide unit of the present invention is made to have the length (L) equivalent to two pieces of the rolling elements 5 and the depth (H) set to the equivalent of an amount of elastic deformation that might occur in the raceway groove 7 because of the rolling elements 5 when the load race undergoes the load reaching a half of the basic static load rating.

The crowning portion 9 is further is worked to allow the rolling elements 5 moving in and out of the raceway 38 with more smoothness, alleviating any concentration of stress, thereby improving the durability. The smooth running of the rolling elements 5 helps render the variation in sliding motion of the slider 1 less. Thus, the more gently the crowning portion 9 is made in the curved profile, the more the traveling accuracy is improved. Nevertheless, the more gently the crowning portion 9 is made in the curved profile, the longer the crowning 9 is in length (L). This results in lessening the length of the load race 13 in the slider 1. That is, the raceway 38 would shorten substantially in length with respect to the limited carriage length (A). Shortage of the raceway 38 in length results in making the preselected nominal capacity less and, therefore, the slider 1 couldn't be applied for a diversity of the linear motion guide units at large, besides operational condition of light load.

The crowning portion 9 in the present invention is constructed with design considerations as stated earlier to provide the slider 1 applicable extensively to the linear motion guide unit of the standard specification even with high accuracy as well as high durability.

For the provision of the crowning portion 9 conforming to the design consideration as stated earlier, the crowning portion length (L) spanning from the end 8 of the carriage 3 to the raceway 38 of the raceway groove 7 is determined to the dimension equivalent to two pieces of the rolling elements 5, while the crowning portion depth (H) reaching the point 48 of intersection of a straight line lying on the end 8 of the carriage 3 with a straight line starting from a point 45 on the raceway 38 in the raceway groove 5 and extending forwards along the crowning portion 9 is set to the equivalent of an amount of elastic deformation that might occur in the raceway groove 7 because of the rolling elements when the load race undergoes the load reaching a half (0.5Co) of the basic static load rating (referred as Co hereinafter). In the linear motion guide unit using the rolling element 5 of 4.7625 mm in diameter, the crowning length (L) results in 9.53 mm while the crowning depth (H) is 0.025 mm. Thus, the crowning portion 9 made as stated above is the gently curved profile of very tiny size not to be viewed with naked eye.

Figure 12:
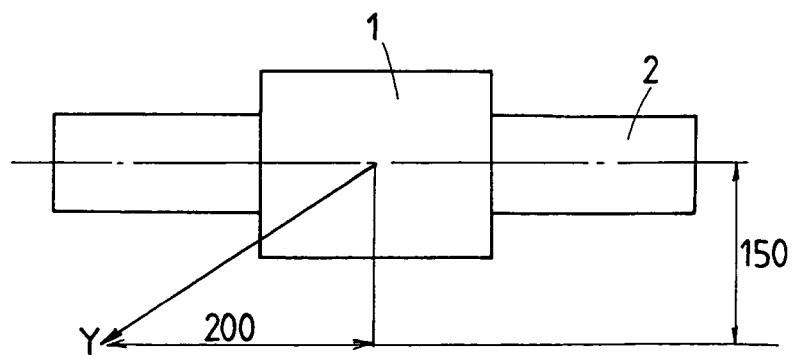
FIG. 12 is a schematic plan view explaining a method of measuring traveling accuracy in the linear motion guide unit of the present invention.
Figure 13:
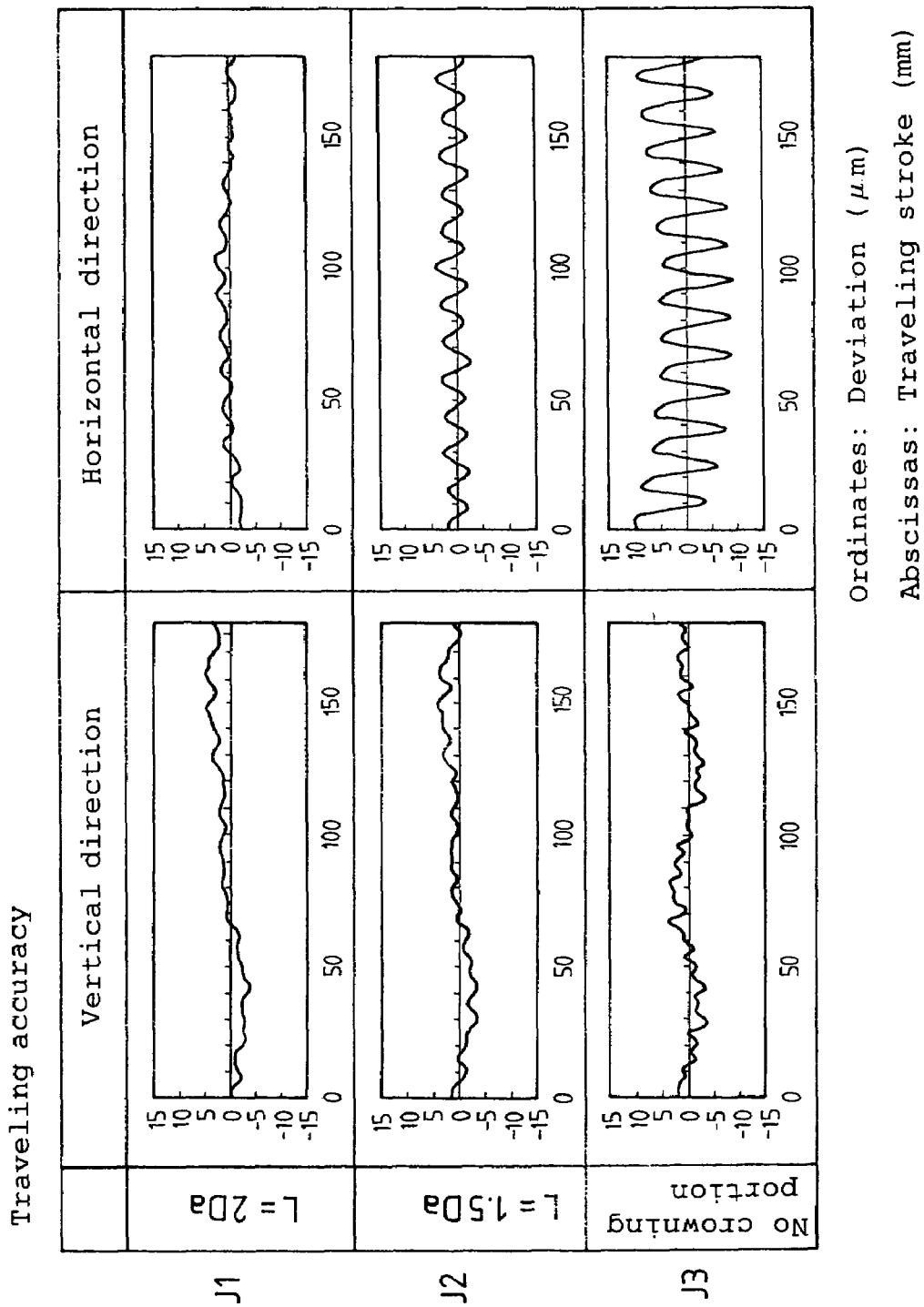
FIG. 13 is a graphic display of results given by the measurement method of FIG. 12 to weigh differences among various conditions of the crowning profile.

The crowning portion length (L) recited earlier was given as a result of experiments and trials so far. Results shown in FIG. 13 in different crowning specifications were observed in measurement of the traveling accuracy of the slider 1 that traveled over the guide rail 2 in the operational condition shown in, for example, FIG. 12. With the linear motion guide unit of the slider 1 fit over the guide rail 1 for free movement shown in FIG. 12, there was provided an arm extending slantwise from the centre of the slider 1 to magnify the variations in the posture of the slider 1. The arm was oriented in a way the tip thereof lay 150 mm sidewise away from the lengthwise axis of the guide rail 2 while 200 mm lengthwise away from the centre of the slider 1 to measure the variations in both the horizontal and vertical directions. In FIG. 13, there are shown results observed in the linear motion guide unit in FIG. 12. Reference sign J1 represents the variations in posture of the slider 1, or deviations at the tip of the arm, which were observed in linear motion guide unit having the crowning length (L) equivalent to two pieces of the rolling elements 5. Reference sign J2 represents the variations in posture of the slider 1, or deviations at the tip of the arm, which were observed in linear motion guide unit having the crowning length (L) equivalent to one and half pieces of the rolling elements 5. Reference sign J3 further represents the variations in posture of the slider 1, or deviations at the tip of the arm, which were observed in linear motion guide unit where the beveled edge 10 remained intact, that is, no crowning portion 9 of gently sloping profile is made so that the crowning depth H was left deep. The crowning depth (H) in the J1 and J2 was commonly determined to the equivalent to the 0.5 Co. In FIG. 13, the ordinates refer to the deviation ($\mu$m) while the abscissas are the traveling stroke (mm).

As seen from the observed results recited earlier, the traveling accuracy could be improved, even though in the crowning length (L) of the crowning portion 9 was equivalent to one and half pieces of the rolling element 5 (refer to J2), but better improved in the crowning length L equivalent to two pieces of the rolling element 5 (refer to J1). It will be thus understood from the J1 that the crowning portion 9 of the length (L) equivalent to two pieces of the rolling element 5 was effective to render the deviations less in both the horizontal and vertical directions, thereby making sure of better traveling accuracy. Contrary to the above, the J3 where no crowning was worked in the raceway groove 7 caused large deviation in horizontal direction, getting the traveling accuracy worse. The crowning length equivalent to three pieces of rolling element 5, although not shown, was more effective in improvement of the traveling accuracy. In contrast, the crowning length equivalent to three pieces of rolling element 5 would make the nominal load capacity of the linear motion guide unit less. Nevertheless, the crowning length reaching three pieces of rolling element 5 would be available for the carriage greater in length (A) than the usual, because of having a little impact on the slider 1 longer in the raceway groove 7. Thus, it will be found that the crowning portion 9 corresponding in length (L) to two pieces of the rolling element 5 makes sure of most desirable traveling accuracy with a little or no impact on the nominal load capacity of the linear motion guide unit, helping the provision of the linear motion guide unit overcoming the issues in the prior guide units. With the linear motion guide unit recited earlier, it is to be understood that the crowning length (L) of the crowning portion 9 spanning the two pieces of the rolling element 5 includes an acceptable range of from not less than the one and half to less than the two and half of the rolling element 5: $1.5 \leq L < 2.5$. It is moreover of course that the crowning length of the three rolling elements 5 may be acceptable for the carriage larger in length (A) than the usual. The carriage length (A) is preferably determined such that the crowning portion 9 can account for 20% to 40% of the carriage length (A), which would be given based of the crowning length (L) is equal to 2Da (Da is referred as the diameter of the rolling element).

Figure 11:
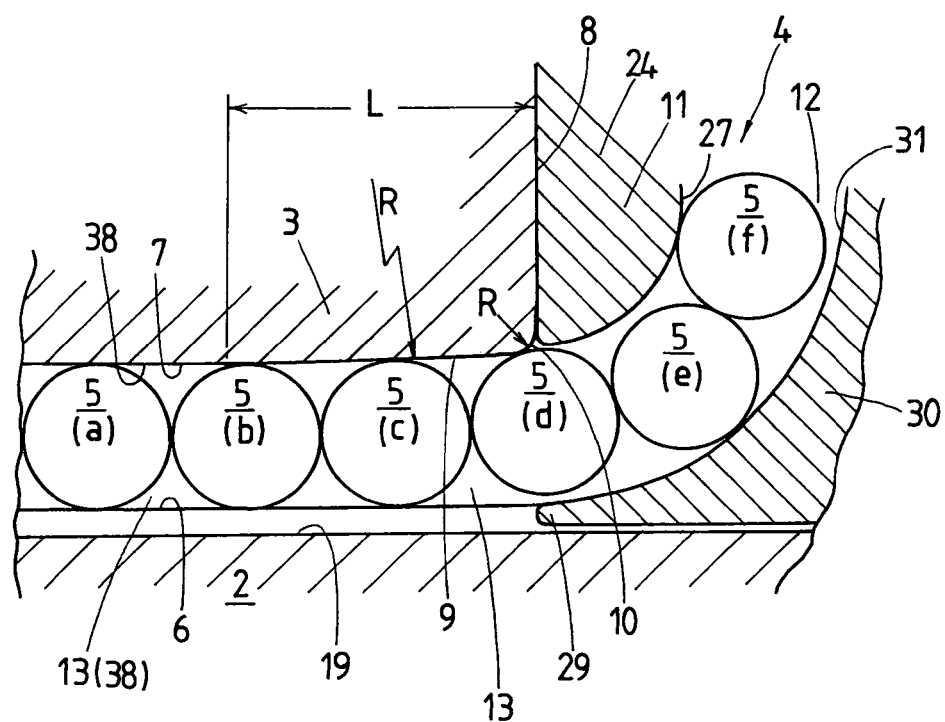
FIG. 11 is an enlarged view explaining how the rolling elements move in and out from a load race of the linear motion guide unit constructed according to the present invention.

It is more desirable that the crowning portion is made more gently. For the provision of the slider 1 applicable extensively to the linear motion guide unit of the standard specification, moreover, the crowning depth (H) with respect to the carriage 3 is determined to the equivalent of an amount of elastic deformation that might occur in the raceway groove 7 because of the rolling elements when the load race undergoes the load reaching a half (0.5Co) of the basic static load rating (referred as Co hereinafter). This crowning depth helps make the crowning portion 9 most desirable, with conjoining with the crowning length (L) of the two pieces of the rolling element 5. With the linear motion guide unit of the present invention, in particular, the boundary between the crowning portion 9 and the end 8 of the carriage 3 is made into the rounded bevel 10 with no sharp edge. The rounded bevel 10 as shown in FIG. 11 corresponds the junction between the load race 13 and the turnaround passage 12, and rises somewhat above the level (depth (F)) of the inside curved surface 27 of the turnaround passage 12. With the linear motion guide unit constructed as stated earlier, the rolling elements 5(a)~5(f) rolling through the recirculation circuit 40 will come successively into collision against the rounded bevel 10. In FIG. 11, the rolling element 5(d) is shown as coming into collision against the rounded bevel 10. In the prior linear motion guide unit, the junction between the load race and the turnaround passage could suffer damage owing to the large impact caused by the high-speed circulation of the rolling elements 5, thereby becoming short-lived. With the linear motion guide unit of the present invention, in contrast, the bevel 10 of rounded contour is made to merge into the crowning portion 9 without causing any discontinuity between them and further finished with the fine-lapping operation into the mirror surface that is more comparable quality in surface roughness than the raceway groove 7. Thus, the bevel 10 of rounded contour can be alleviated in collision impact with the rolling elements 5 to serve over an entire service-life thereof. As the damage suffered in the prior beveled edge with the sharp corner 46 remaining as shown in FIG. 14 is at most in a matter of 0.1 mm, the rounded bevel 10 is only made in the curved contour having the radius of curvature (R) in the transverse section, which is at least not less than 0.1 mm.

The crowning portion 9 is very suitable for the linear motion guide unit in which the raceway groove 7, especially, is made in the form of gothic arched groove that comes into four point-contacts (S1, S2, S3 and S4 of FIG. 4) with the rolling element 5, working together with the mating raceway groove 6 on the guide rail 2. The raceway groove 7 for the load race 13 of the gothic arched form, as shown in FIG. 4, is made up of an upper groove part 21 and the lower groove part 22, which merge together with one another to complete the raceway groove 7. With the raceway groove 7 made in the form of gothic arched groove, the rolling elements 5 will move into both the upper groove part 21 and the lower groove part 22 at a time and therefore suffer much interference at the ingress/egress 39. The crowning portion 9 constructed as stated earlier in the linear motion guide unit is remarkably beneficial to deal with the adverse interference at the ingress/egress 39. Moreover, the crowning profile of the crowning portion 9 can be made easily at the ingress/egress 39 of the load race 13 and, despite of very tiny part in the raceway groove 7, beneficial for high traveling accuracy and long-lasting service life of the linear motion guide unit.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A linear motion guide unit comprising a guide rail having a raceway groove extending lengthwise thereof and a slider movable relatively to the guide rail by virtue of more than one rolling element, the slider being comprised of a carriage made with a raceway groove in opposition to the raceway groove of the guide rail to define a load race between the opposed raceway grooves and a return passage extending in parallel with the load race, end caps attached to forward and aft ends of the carriage and made with turnaround passages communicating the load race with the return passage, more than one rolling element allowed to run through a circulation way of the load race and a non-loaded area made up of the turnaround passages and the return passage, and the end cap including therein a major cap body having an outside curved half for the turnaround passage and a spacer unit having a spacer piece that is incorporated in the major cap body to form an inside curved half for the turnaround passage;

wherein the raceway groove on the carriage is made in a gothic arched groove which has four point contacts with the rolling element together with the mating raceway groove on the guide rail;

wherein the raceway groove on the carriage has crowning portions each having a curved profile toward the turnaround passage at forward and aft ends for ingress/egress areas of the load race to facilitate movement of the rolling element in and out of the load race;

wherein the crowning portions each include a curved profile that has a constant radius of curvature in a direction of a contact angle on each of two contact positions of the raceway groove on the carriage with the rolling element;

wherein the crowning portions each extend in the lengthwise direction of the guide rail over a length from the forward or aft end of the carriage to a location on the raceway groove of the curved profile where the crowning portion starts, the length of the crowning portion having a dimension substantially twice a diameter of the rolling element, the crowning portion having a depth, where the curved profile intersects with the end of the carriage, the depth of the crowning portion being defined by an amount of elastic deformation in the direction of the contact angle, which occurs between the raceway groove and the rolling element in the load race when the load race undergoes a load reaching a half of a static nominal standard load of the linear motion guide unit, wherein the crowning portions at ends of the carriage each include a bevel of rounded contour which engages an end of the spacer piece, which is an edge of the inside curved half of the turnaround, the rounded contour of the bevel merging evenly into the curved profile of the crowning portion without causing any discontinuity at a boundary between the bevel and the curved profile of the crowning portion, and wherein the bevel has a fine-lapped mirror surface that has a surface roughness lower than the surface roughness of the raceway groove on the carriage.

2. A linear motion guide unit constructed as defined in claim 1, wherein a surface roughness of a raceway surface over the crowning portions on the carriage is the same as the surface roughness of the raceway groove on the carriage.

3. A linear motion guide unit constructed as defined in claim 1, wherein the bevel of the curved contour has a radius of curvature not less than 0.1 mm.

4. A linear motion guide unit constructed as defined in claim 1, wherein the crowning portions on the carriage account for 20%-40% of overall length of the carriage.

* * * * *